(12) United States Patent
Krivopaltsev et al.

(10) Patent No.: US 7,970,890 B1
(45) Date of Patent: Jun. 28, 2011

(54) EXTENDABLE TELEMETRY SERVICE

(75) Inventors: Eugene Krivopaltsev, San Jose, CA (US); Jean-Christophe Martin, San Jose, CA (US); Alexander Vul, Palo Alto, CA (US)

(73) Assignee: Oracle America Inc., Redwood City, CA (US)

( * ) Notice: Subject to any disclaimer, the term of this patent is extended or adjusted under 35 U.S.C. 154(b) by 1588 days.

(21) Appl. No.: 10/898,274

(22) Filed: Jul. 23, 2004

(51) Int. Cl.
G06F 15/173 (2006.01)
H04L 12/16 (2006.01)

(52) U.S. Cl. ......... 709/224; 709/223; 370/241; 370/252

(58) Field of Classification Search .................. 709/223, 709/224; 370/241, 252
See application file for complete search history.

(56) References Cited

U.S. PATENT DOCUMENTS

| | | | | |
|---|---|---|---|---|
| 5,379,383 | A * | 1/1995 | Yunoki | 709/203 |
| 6,667,972 | B1 * | 12/2003 | Foltan et al. | 370/354 |
| 6,721,907 | B2 * | 4/2004 | Earl | 714/57 |
| 7,349,340 | B2 * | 3/2008 | Sahai et al. | 370/235 |
| 2002/0046284 | A1 * | 4/2002 | Brabson et al. | 709/228 |
| 2003/0023450 | A1 * | 1/2003 | Casati et al. | 705/1 |
| 2003/0069974 | A1 * | 4/2003 | Lu et al. | 709/226 |
| 2004/0103195 | A1 * | 5/2004 | Chalasani et al. | 709/226 |

OTHER PUBLICATIONS

Sun Microsystems, Inc., Chapter 11 entitled Writing Management Protocol Adaptors (MPAs), 34 pgs., © 2001, http://docs.sun.com/source/816-2002/CPPdevGuide_mpa.html.

* cited by examiner

Primary Examiner — William C Vaughn, Jr.
Assistant Examiner — Umar Cheema
(74) Attorney, Agent, or Firm — Osha • Liang LLP

(57) ABSTRACT

In accordance with one embodiment, there are provided mechanisms and methods for creating a telemetry process for a service in a computing environment. With these mechanisms and methods, it is possible to deploy telemetry processes for the service based upon a specification of one or more operational metrics for determining the status of the service. This ability to deploy telemetry processes for the service based upon a specification of one or more operational metrics for determining the status of the service makes it possible to attain improved monitoring capabilities and more efficient usage of computing resources assigned to monitoring tasks for a service in a computer system.

12 Claims, 8 Drawing Sheets

SIMPLEBOOKSTORE  ⎯440
    KQI STATUS
      <components>
        WebServer
        BusinessLogic
        DataBase
      STATUS = WebServer + BusinessLogic + DataBase

*Fig. 4A*

EXTENDABLE TELEMETRY SERVICE

BACKGROUND

In many computer implementations, it is desirable to be able to monitor a service that is being provided by one or more hardware and software components in a computing environment. Conventional approaches to the problem typically employ multiple agents deployed at each component, which collect information related to the service and/or deployment of said service. In one possible approach, generic agents collect all types of information and provide the information to a centralized process. The agents relay all the collected information to the centralized process that determines what data, if any, is useful to determine the state of the process being monitored. Often, much more information is collected than is needed. Accordingly, the centralized process must sort through the output of each generic agent to determine which data is relevant in order to produce reports and/or display status.

In another possible approach, a special purpose agent may be configured to monitor each component. In these approaches, the agent must be changed or replaced if growth or change to the service necessitates the need for different status information. Agent change or replacement in such approaches, however, can result in lost time and productivity as systems are brought off line, updated, tested and debugged before being restored to service.

SUMMARY

In accordance with one embodiment of the present invention, there are provided mechanisms and methods for establishing a telemetry process for a service in a computing environment. With these mechanisms and methods, it is possible to establish a telemetry process for the service based upon a specification of one or more operational metrics for determining the status of the service. Embodiments of the present invention can be implemented in computing environments in which a plurality of components interact to provide a service. Components can include hardware, software or some combination thereof. A monitoring process associated with a service component may be deployed dynamically where the service component is deployed, and can follow a relocation of the associated component due to address fail over or on-demand provisioning, i.e., capacity on demand. In one embodiment, a service model may be used to derive facts such as, without limitation: How to access the monitored information; How to compute the key quality indicators (KQIs) from the monitored information; Where to deploy the monitoring processes and the various functions; and so forth.

In specific embodiments, the service may be made available to customers that access the service from local or remote computers over networks or other remote access methods. For example, an online bookstore service can be provided by a web server, server hardware, a database and business logic that interact to provide the service to customers. In this case, the customers can access the online bookstore service using a web browser program on their own computers.

In one embodiment, a specification of a service and an operational metric for monitoring a state of the service are received. The specification includes a plurality of components that interact with one another to provide the service. The operational metric for the service is derived based upon an operational metric of the components. A set of one or more process modules for obtaining the operational metric for each component are determined from the specification of the service and the operational metric for the service. A set of one or more process modules for obtaining the operational metric for the service from the operational metric for each component are determined from the specification of the service and the operational metric for the service. The one or more process modules for obtaining the operational metric for each component and the one or more process modules for obtaining the operational metric for the service are dynamically deployed.

Some embodiments enable users to define their own services based upon an existing service, which is stored as a model template. In one embodiment, the set of one or more process modules for obtaining the operational metric for each component are saved as a model template. A set of one or more process modules for obtaining the operational metric for the service may be saved in the model template also. One or more changes to the service or the operational metric for monitoring a state of the service are received. The one or more changes are made to the model template to form a revised model template. The revised model template comprises at least one of a revised set of one or more process modules for obtaining the operational metric for each component and a revised set of one or more process modules for obtaining the operational metric for the service from the operational metric for each component. The process modules of the revised model template are dynamically deployed in connection with providing the service.

In various embodiments, the present invention enables establishing a telemetry process for a service in a computing environment. This ability to establish telemetry processes for the service based upon a specification of one or more operational metrics for determining the status of the service makes it possible to attain improved monitoring capabilities and more efficient usage of computing resources assigned to monitoring tasks for a service in a computer system. In one embodiment, an inheritance mechanism can eliminate the need to duplicate an entire service model in cases where a revised service model can be obtained by making revisions to an existing service model. In one embodiment, inheritance enables definition of a "base" logical model that later could be extended.

BRIEF DESCRIPTION OF THE DRAWINGS

FIGS. 4A-4B are diagrams illustrating a specification of an example service with telemetry in one embodiment of the present invention.

DETAILED DESCRIPTION OF EMBODIMENT(S)

Conceptual Overview

In accordance with one embodiment of the present invention, there are provided mechanisms and methods for establishing a telemetry process for a service in a computing environment. With these mechanisms and methods, it is possible to establish a telemetry process for a service based upon a specification of one or more operational metrics for determining the status of the service. Embodiments of the present invention can be implemented in computing environments in which a plurality of components interact to provide a service. Components can include hardware, software or any combination thereof. A monitoring process associated with a service component may be deployed dynamically where the service component is deployed, and can follow a relocation of the associated component due to address fail over or on-demand provisioning, i.e., capacity on demand. In one embodiment, a service model may be used to derive facts such as, without limitation: How to access the monitored information; How to compute the key quality indicators (KQIs) from the monitored information; Where to deploy the monitoring processes and the various functions; and so forth.

In specific embodiments, the service may be made available to customers that access the service from local or remote computers over networks or other remote access methods. For example, an online bookstore service can be provided by a web server, server hardware, a database and business logic that interact to provide the service to customers. In this case, the customers can access the online bookstore service using a web browser program on their own computers. The ability to establish telemetry processes that are customized to a particular service based upon a specification of an operational metric makes it possible to attain improved monitoring capabilities and more efficient usage of computing resources assigned to monitoring the service.

Figure 5A:
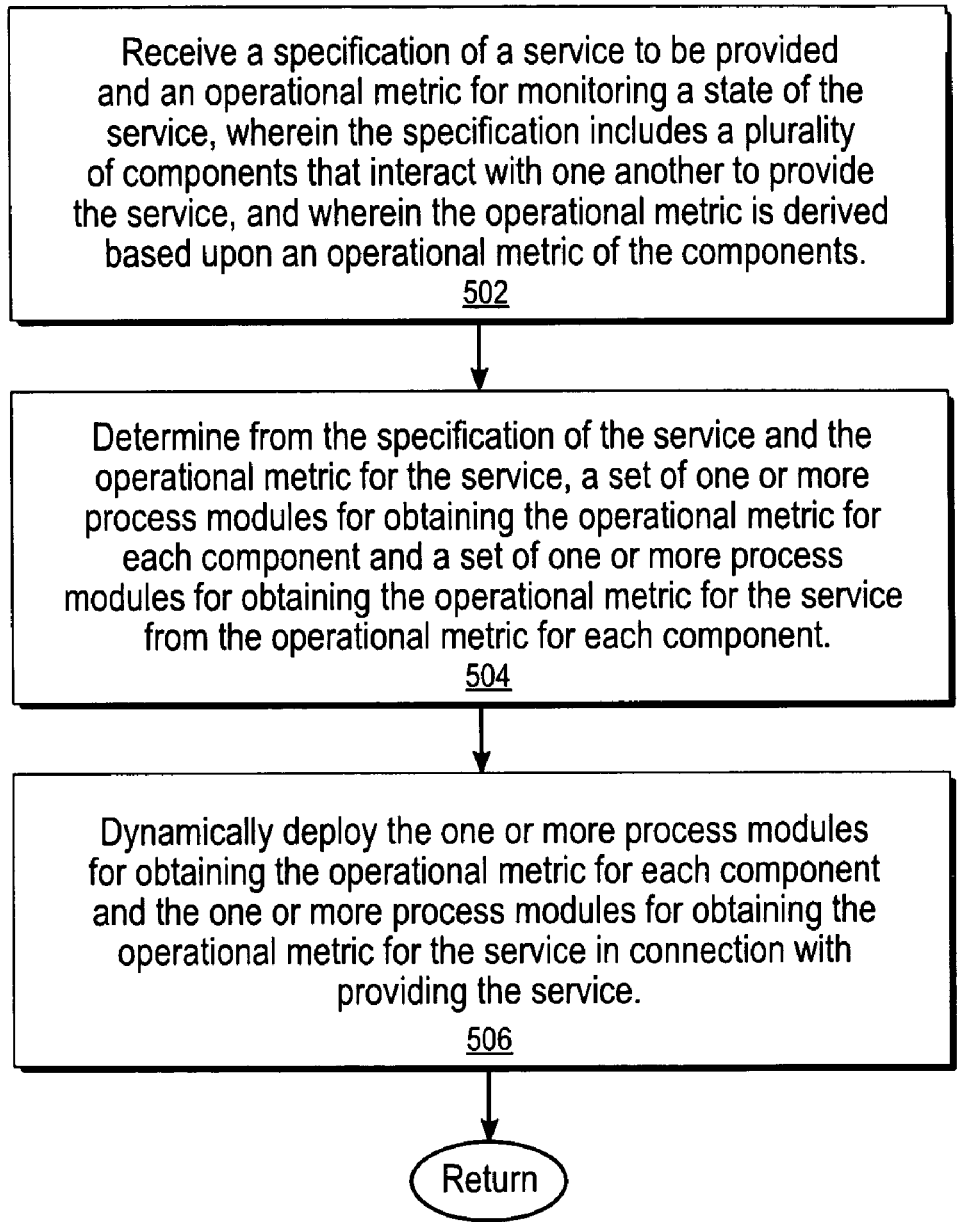
FIGS. 5A-5B are operational flow diagrams, which provide a high level overview of one embodiment of the present invention.

An operational flow diagram, which provides a high level overview of one embodiment of the present invention, is shown in FIG. 5A. In one embodiment, a specification of a service and an operational metric for monitoring a state of the service are received (block 502). The specification includes a plurality of components that interact with one another to provide the service. The operational metric is derived based upon an operational metric of the components. A set of one or more process modules for obtaining the operational metric for each component and a set of one or more process modules for obtaining the operational metric for the service from the operational metric for each component are determined (block 504) from the specification of the service and the operational metric for the service. The one or more process modules for obtaining the operational metric for each component and the one or more process modules for obtaining the operational metric for the service in connection with providing the service are dynamically deployed (block 506).

In one embodiment, the specification includes a set of one or more elements of one or more of the plurality of components and an operational metric for the elements. The elements interact with one another to provide the functionality of the component. Determining a set of one or more process modules for obtaining the operational metric for each component includes determining a set of one or more process modules for obtaining the operational metric for each element from the specification of the set of one or more elements of one or more of the plurality of components and the operational metric for the service. In various embodiments, operational metric for one or more elements may be obtained using a variety of interface techniques, including without limitation, Java Management Extensions (JMX), remote shell (rsh), Simple Network Management Protocol (SNMP), Common Information Model (CIM) and so forth. Determining a set of one or more process modules for obtaining the operational metric for each component further includes determining a set of one or more process modules for obtaining the operational metric for the component from the operational metric for each element.

In one embodiment, dynamically deploying the one or more process modules for obtaining the operational metric for each component includes provisioning a device using the one or more process modules for obtaining the operational metric for each component. The term "dynamically deploying" is used herein to refer to the automated configuring of one or more process modules for obtaining the operational metric for the service. For example, in one embodiment, dynamically deploying includes provisioning a device using the one or more process modules for obtaining the operational metric for the service.

In one embodiment, determining a set of one or more process modules for obtaining the operational metric for each component from the specification of the service and the operational metric for the service includes determining a process for computing a key quality indicator (KQI) for the components of the service. A KQI is a measure track the composition of a set of one or more performance variables over time. The KQI may be derived from a composition function, which may be arbitrary. Accordingly, the KQI can provide an indication of the performance of a complex service. In one embodiment, determining a process for computing a key quality indicator (KQI) for the components of the service includes determining a dynamically configurable object class for the key quality indicator. In one embodiment, any quantities not relevant to monitoring the state of the service are excluded from the set of one or more quantities to be monitored.

In one embodiment, determining a set of one or more process modules for obtaining the operational metric for the service from the operational metric for each component includes determining the set of one or more process modules for obtaining the operational metric for the service from an operational metric for each component of the service. The operational metric is computed by the set of one or more process modules for obtaining the operational metric for each component and exposed to the set of one or more process modules for obtaining the operational metric for the service.

In another aspect, the invention provides in one embodiment, a method that includes receiving a specification of a service and a service operational metric for monitoring a state of the service. The specification includes a plurality of components that interact with one another to provide the service. The service operational metric is derived based upon at least one component operational metric for monitoring a state of at least one of the components. A set of one or more process modules for obtaining at least one component operational metric for at least one of the components is determined from the specification of the service and the service operational metric. Also, a set of one or more process modules for obtaining the service operational metric from the at least one component operational metric is determined from the specification of the service and the service operational metric. The one or more process modules for obtaining the at least one component operational metric and the one or more process modules for obtaining the service operational metric are dynamically deployed.

In other aspects, the invention encompasses in some embodiments, computer apparatus, computing systems and machine-readable media configured to carry out the foregoing methods.

Embodiments can enable creating telemetry processes for the service based upon a specification of one or more operational metrics for determining the status of the service. In various embodiments, the present invention enables creating a telemetry process for a service in a computing environment. In one embodiment, an inheritance mechanism can eliminate the need to duplicate an entire service model in cases where a revised service model can be obtained by making revisions to an existing service model. In some embodiment, inheritance enables definition of a "base" logical model that later could be extended by various business services. Embodiments can provide dynamic operational models of telemetry for complex operational environments. In some embodiments, existing telemetry models may be used reflect different facets of a deployment. In one embodiment, telemetry components, such as without limitation metadata descriptors, rules, acquisition mechanisms may be made available in a metadata repository. Embodiments can provide service template descriptions that provide a plurality of viewpoints for modeling a telemetry service, such as without limitation, a logical view that is exposed to consumers and a physical view that represents the physical aspects of data acquisition.

System Overview

Figure 1:
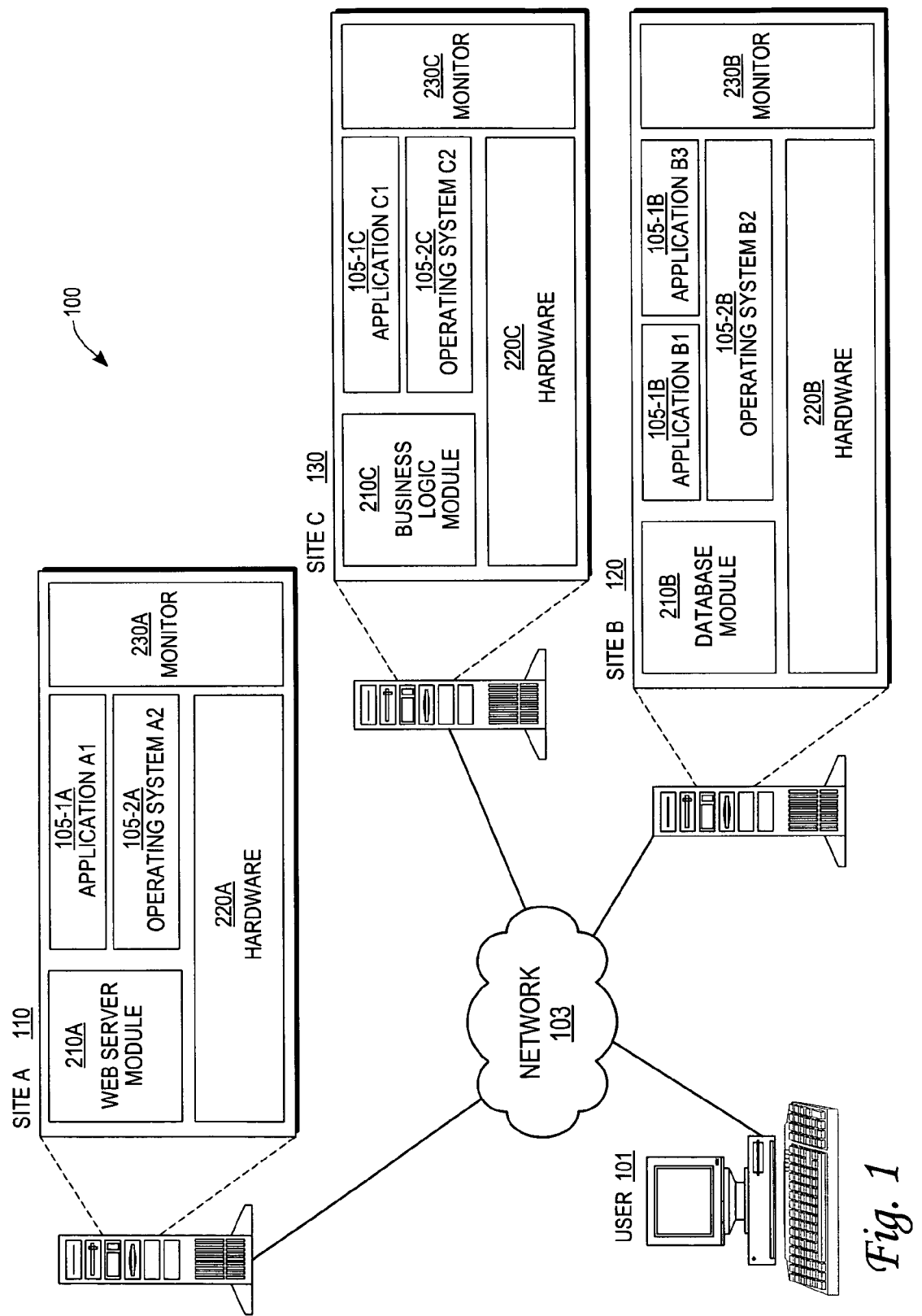
FIG. 1 is a functional diagram of a computing environment in which telemetry monitors provide status information for a plurality of components implementing a service in accordance with one embodiment of the present invention.

FIG. 1 is a functional diagram of a computing environment in which telemetry monitors provide status information for a plurality of components implementing a service in accordance with one embodiment of the present invention. While the invention is illustrated generally with reference to an example embodiment that implements an on-line bookstore service, it will be appreciated that the techniques of the present invention are broadly applicable to many types of computer implemented services, such as financial transactions, i.e., banking, equity and commodity trading; merchandise sales, i.e., book sales clothing sales; consumer and business services, i.e., travel agency, equipment rental; an internet service provider (ISP) and other services implemented upon a computer are contemplated. For example an ISP may include various services components, such as without limitation routers, switches, servers and other hardware and software that provide infrastructure to the ISP services. The example services include without limitation DSL provisioning, frame relay circuits, web hosting, mail hosting and communication infrastructure provisioning and related services, as well as computing and data resource infrastructure and related services. Further, the present invention is illustrated using an example environment in which a plurality of computers is connected using a network-based connection. The present invention does not, however, require such an environment, and in some embodiments, techniques according to the invention may be implemented as separate processes in a multiprocessing computing system, or with greater or fewer number of computers, or with other programmable devices, or the like.

As shown in FIG. 1, a service 100 is implemented by a plurality of component machines, including a first site A 110, a second site B 120 and a third site C 130. In the example configuration depicted by FIG. 1, a first machine comprising site A 110 is connected to a network 103, which provides connectivity to a second machine comprising site B 120, a third machine comprising site C 130 and to a user machine 101. Network 103 may be any type of network, however, in one embodiment, network 103 comprises a packet network. Further, network 103 may provide connection to other machines not shown in FIG. 1 for purposes of clarity. In one example configuration, site A 110, site B 120 and site C 130 may provide one or more components of service 100 to users 101 using web sites, database managers, operating systems, hardware and so forth. For example, in one implementation, service 100 may be an on-line bookstore. In one example configuration, site A 110, site B 120 and site C 130 implement the on-line bookstore with a web server, database manager and business logic. Other services are also possible as noted above. Accordingly, in various example configurations, site A 110, site B 120 and site C 130 may be workstations, servers, other computers or various combinations thereof. Further, one or more of site A 110, site B 120 and site C 130 may be omitted in some configurations depending upon the requirements of a particular implementation.

In the embodiment illustrated by FIG. 1, site A 110 includes a web server module 210A, which performs processing to enable a user, such as user 101, to access the service 100 using a web site. Site A 110 includes hardware 220A, which supports the web server module 210A. In one embodiment, hardware 220A may comprise a general-purpose computer such as that illustrated by FIG. 6. Site A 110 also may include one or more applications, such as application A1 105-1A, which is resident in site A 110 and provides functionality associated with web server 210A to users 101. The functionality provided by application A1 105-1A can vary in accordance with the implementation. In one example embodiment, application A1 105-1A may provide an online bookstore user interface, for example. Other applications, such as a shopping cart, a gateway to a security service and so forth may be provided by application A1 105-1A in other implementations. Site A 110 also includes an operating system A2 105-2A that manages the resources of hardware 220A to provide support for application A1 105-1A and web server module 210A.

As further illustrated by FIG. 1, site B 120 includes a database module 210B, which performs processing to enable a user that is working with a web site provided by site A 110 to access information of a database located at site B 120 in connection with using service 100. Site B 120 includes hardware 220B, which supports the database module 210B. In one embodiment, hardware 220B may comprise a general-purpose computer such as that illustrated by FIG. 6. Site B 120 also includes one or more applications, such as application B1 105-1B and application B3 105-3B, which are resident in site B 120. The functionality provided by application B1 105-1B or application B3 105-3B can vary by implementation. For example, in one example embodiment, application B1 105-1B may provide a bookstore catalog for the online bookstore service of application A1 105-1A. Other database related applications, such as a customer preferences, account information, shipping information and so forth may be provided by application B1 105-1B or B3 105-3B in other implementations. Site B 120 also includes an operating system B2 105-2B that manages the resources of hardware 220B to provide support for applications B1 105-1B, B3 105-3B and database module 210B.

With further reference with FIG. 1, a site C 130 includes a business logic module 210C, which performs processing to control the access by a user to resources provided by either site A 110 and/or site B 120. Site C 130 includes hardware 220C that may comprise a general-purpose computer such as that illustrated by FIG. 6, which supports the business logic module 210C. Site C 130 also may include one or more applications, such as application C1 105-1C, which provides functionality in accordance with the particular service implementation. Site C 130 also includes an operating system C2 105-2C that manages the resources of hardware 220C to provide support for application C1 105-1C and the business logic module 210C.

In one embodiment, telemetry functionality for providing status and/or performance information about the functioning of the service 100 is provided by a plurality of distributed telemetry components, such as monitor 230A located at site A 110, monitor 230B located at site B 120 and monitor 230C located at site C 130. In a new function provided by embodiments according to the invention, monitor embodiments 230A, 230B and 230C may be deployed in accordance with a service telemetry model incorporated into the specification of the service in order to meet the particular requirements of the device or process being monitored. The telemetry model includes information such as the telemetry modules to be deployed in order to monitor the components of the service, the operational metrics to be determined for each component, the type of data acquisition mechanism for each component and so forth. The structure and function of example monitor embodiments 230A, 230B and 230C will be described in further detail with reference to FIG. 2 below.

Figure 2:
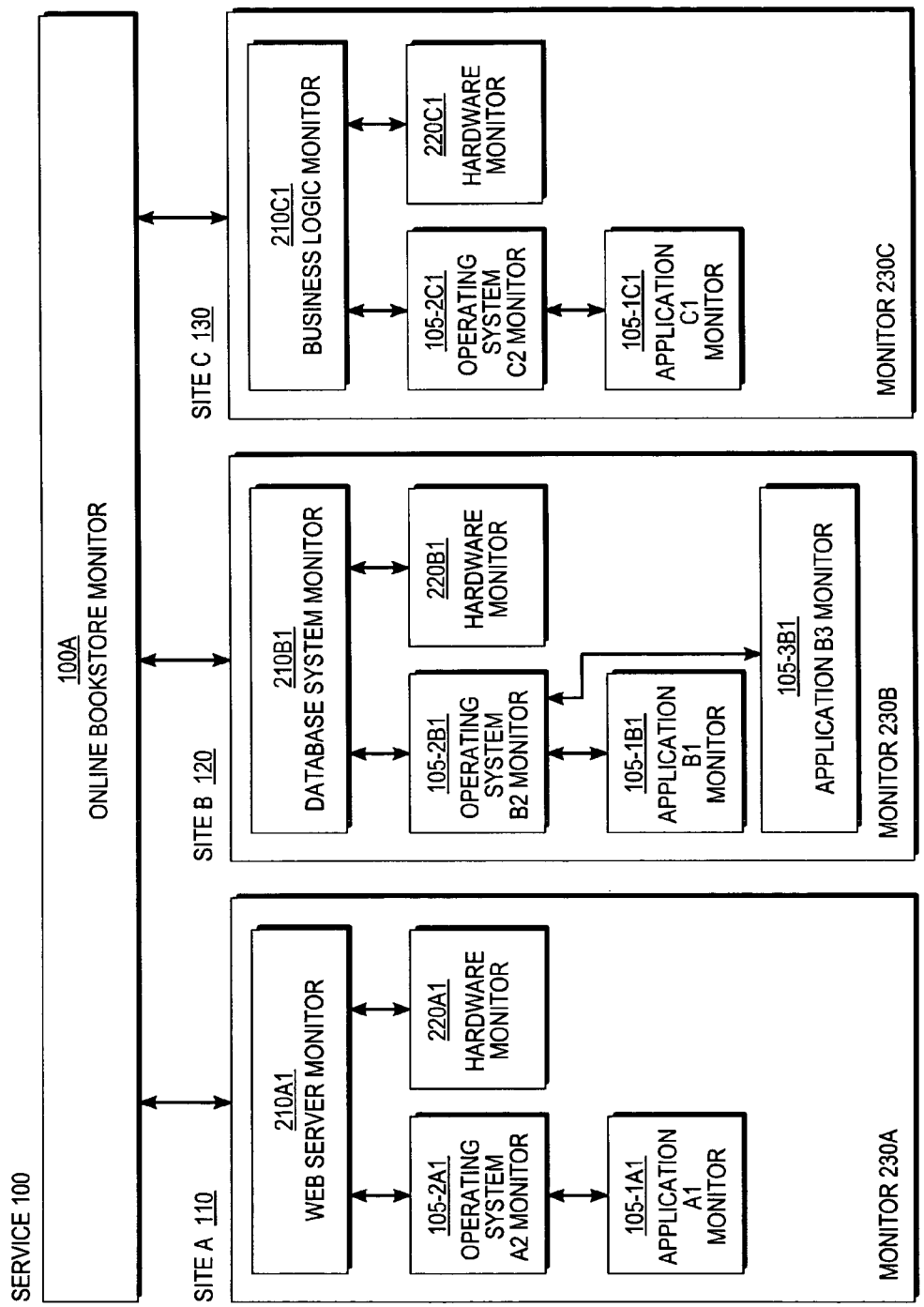
FIG. 2 is a functional diagram of a plurality of telemetry monitors that provide status information in a service implemented in the computing environment illustrated by FIG. 1 in accordance with one embodiment of the present invention.

FIG. 2 is a functional diagram of a plurality of telemetry monitors that provide status information in a service implemented in the computing environment illustrated by FIG. 1 in accordance with one embodiment of the present invention. As depicted by FIG. 2, each of the component sites, sites A 110, B 120 and C 130 has an associated telemetry monitor, such as monitor 230A, monitor 230B and monitor 230C, respectively. Monitor embodiments 230A, 230B and 230C collect information about the hardware and software processes located at each monitor embodiment's respective site, form an operational metric from the collected information and provide the operational metric to a higher-level telemetry monitor 100A for the service 100.

In a new function provided by embodiments according to the invention, monitor embodiments 230A, 230B and 230C may be deployed from a service telemetry model in order to meet the particular requirements of the device or process being monitored. In one embodiment, the service telemetry model is expressed in the form of a specification that describes a type of application or hardware from which information is collected, a frequency of sampling, a type of information to collect and so forth. For example, each of monitor embodiments 230A, 230B and 230C may collect information specified as operational metrics in the specification and provide the information to a higher level monitoring process 100A. While the higher level monitoring process 100A may be deployed anywhere, in one embodiment, the higher level monitoring process 100A runs in a server dedicated to managing the service. In one embodiment, a telemetry client locates a service using either lightweight directory access protocol (LDAP), Jini registry, Service Location Protocol (SLP) or the like. In some embodiments, further isolation between telemetry suppliers and consumers is achieved via a messaging mechanism, in which the location of a messaging subsystem is exposed to consumers and suppliers. The higher level monitoring process 100A employs an aggregation function, which may also be specified as part of the service telemetry model, to combine the individual operational metrics into an operational metric for the service. By providing the operational metric for the service, embodiments of the present invention can provide an overall status or performance of the entire service to a user while reducing the amount of extraneous information.

In one embodiment, each of the telemetry monitors may be deployed specifically for the component or components that the telemetry monitor is to monitor based upon the service model. In one embodiment, the service model may be included in a specification for the service. In one embodiment, a specification for the service 100 that includes a description of the components comprising the service 100 to be monitored is used to deploy the telemetry monitors 230A, 230B and 230C to monitor the components of the service 100. The specification of the service 100, as well as an operational metric for monitoring a state of the service may be received from a system administrator or other person tasked with configuring the service 100. An example specification for an on-line bookstore service comprising components of site A 110, site B 120 and site C 130, will be described in further detail with reference to FIG. 3 below.

The operational metric for the service 100 is derived based upon an operational metric for the components comprising the service 100. A set of one or more process modules, monitor 230A, monitor 230B and monitor 230C, for obtaining the operational metric for each of components site A 110, site B 120 and site C 130 are determined from the specification of the service and the operational metric for the service. Further, a set of one or more process modules 100A for obtaining the operational metric for the service from the operational metric for each component are determined from the specification of the service and the operational metric for the service. The one or more process modules for obtaining the operational metric for each component, i.e., 230A, 230B and 230C, and the one or more process modules for obtaining the operational metric for the service 100 A are dynamically deployed. This means that telemetry monitor 230A at site A 110, telemetry monitor 230B at site B 120 and telemetry monitor 230C at site 130 may be deployed in accordance with a specification's description of the components to be monitored. In one embodiment, telemetry monitor 230A is deployed with the functionality to monitor one or more key quality indicators of the component(s) of site A 110. For example, telemetry monitor 230A monitors the functioning of web server module 210A, hardware 220A, application A1 105-1A and operating system A2 105-2A.

Monitor embodiments 230A, 230B and 230C may further comprise sub-components, also referred to as "elements". The elements work together to provide the functionality of the component. In one embodiment, each component's telemetry information may include an aggregate result of telemetry processes of that component's elements. This means that in some embodiments, telemetry information may be hierarchically arranged so that at a particular level in the hierarchy, the telemetry information may be processed using an aggregation function, for example, to form an operational metric that reflects the status and./or performance of the component's constituent elements. As depicted by FIG. 2, monitor embodiment 230A includes a number of elements that monitor operational metrics for elements that comprise the site A 110. For example, monitor embodiment 230A includes a web server monitor 210A1 for monitoring the web server 210A. Further, web server monitor 210A1 is comprised of a plurality of sub-element monitors, including an operating system A2 monitor 105-2A1 and a hardware monitor 220A1 for monitoring the operating system A2 105-2A and the hardware 220A of site A 110, respectively.

In one embodiment, certain elements may have sub-elements, also referred to as "elements". For example, as illustrated by FIG. 2, operating system A2 monitor 105-2A1 has an application A1 monitor 105-1A1 associated with it. Accordingly, in one embodiment, one or more operational metrics that provide status and/or performance information about the sub-element application A1 105-1A will be monitored by its associated monitor, application A1 monitor 105-1A1. The operating system A2 monitor 105-2A1 will reflect the operational metric from the application A1 monitor 105-1A1 in the operational metric for the operating system A2 105-2A. Similarly, monitor embodiments 230B and 230C also comprise sub-components, or elements, as illustrated by FIG. 2.

Each monitoring element may have one or more key quality indicators for monitoring its associated element. In one embodiment, acquisition mechanisms associated with each monitor are used to obtain information for one or more of the key quality indicators that provide status and/or performance criteria for the element being monitored. In various embodiments, acquisition mechanisms can obtain information from elements implemented using a variety of different techniques, including without limitation, Java Management Extensions (JMX), remote shell (rsh), Simple Network Management Protocol (SNMP), Common Information Model (CIM) and so forth. Aggregating functions combine the key quality indicators of a number of elements to obtain an operational metric of a component, or the operational metrics from a number of components to obtain an overall operational metric of a service.

Figure 3:
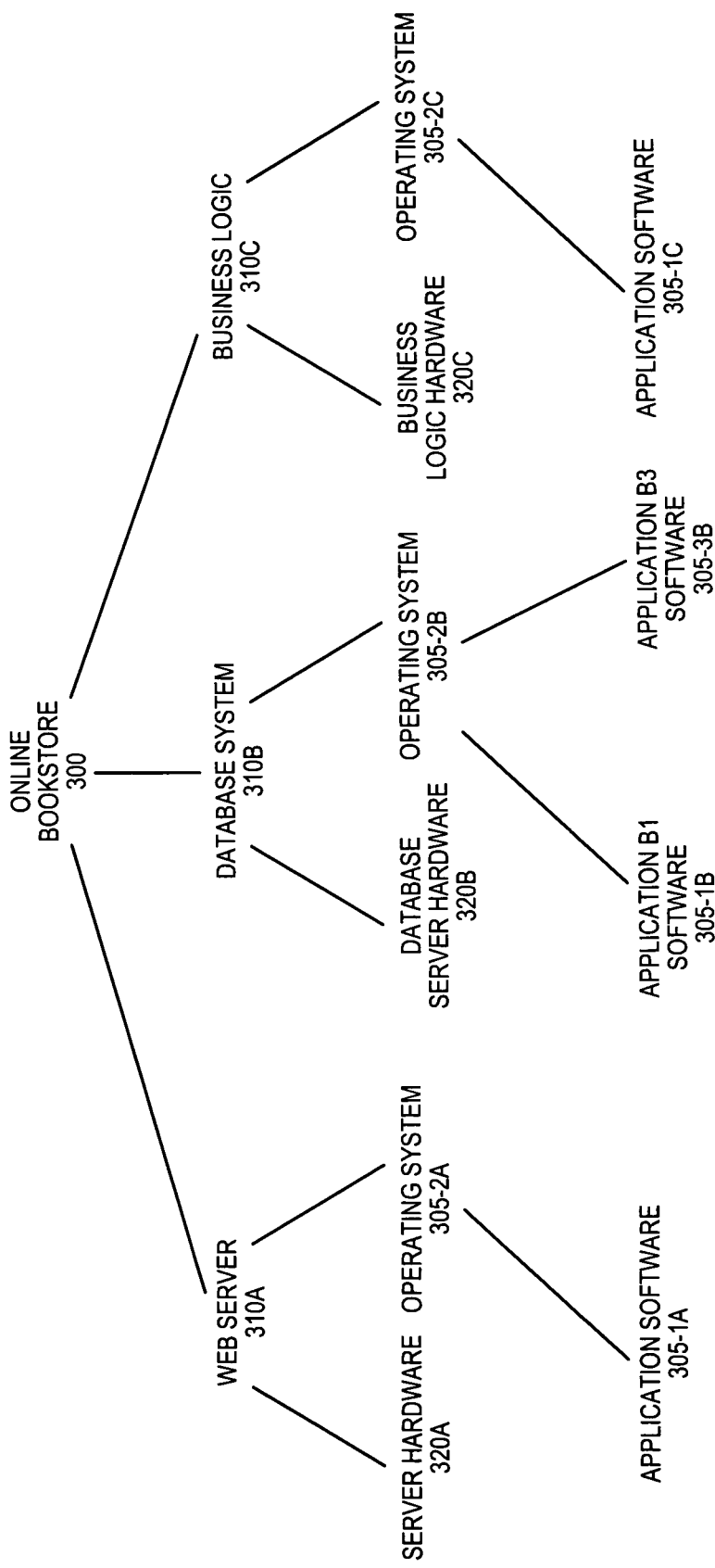
FIG. 3 is a functional diagram that illustrates a specification of a service, components of the service and elements of the components in one embodiment of the present invention.

In one embodiment, a service specification may provide a description of the service from one or more viewpoints, for example a logical view and a physical view. A logical view can provide a viewpoint exposed to telemetry consumers by presenting without limitation telemetry data stream, faults, performance metrics, threshold violations and so forth. A physical view can provide the physical aspects that enable data acquisition. FIG. 3 is a functional diagram that illustrates a specification of a service, components of the service and elements of the components in one embodiment of the present invention. As shown by FIG. 3, an example specification for an on-line bookstore service 300 comprises components including component definitions for a web server 310A, a database system 310B and a business logic 310C. The definitions for the web server 310A, database system 310B and business logic 310C comprise information that will be used to provision components of the service 100, including site A 110, site B 120 and site C 130. The specification 300 includes information about elements of each of the component definitions. For example, the web server 310A component is defined to include server hardware 320A and operating system 305-2A elements. The database system 310B component is defined to include database server hardware 320B and operating system 305-2B elements. The business logic 310C component is defined to include business logic hardware 320C and operating system 305-2C elements.

Certain elements may be comprised of sub-elements, which are also referred to herein simply as "elements". For example, as illustrated by FIG. 3, operating system 305-2A element has an application software element 305-1A, operating system element 305-2B has an application B1 software 305-1B element and an application B3 software 305-3B element, and operating system 305-2C element has an application software 305-1C element.

In one embodiment, one or more of the components or elements may have one or more associated operational metrics that provide status and/or performance information about that component or element. For example, one or more key quality indicators for each element may be specified in the specification for the service. Acquisition mechanisms may be specified to obtain one or more of the key quality indicators. Aggregating functions can be specified to combine the key quality indicators of a number of elements to obtain an operational metric of a component, or the operational metrics from a number of components to obtain an overall operational metric of a service.

In one embodiment, the set of one or more process modules for obtaining the operational metric for each component and a set of one or more process modules for obtaining the operational metric for the service is saved as a model template. The one or more changes to the service or the operational metric for monitoring a state of the service are received. The one or more changes are made to the model template to form a revised model template. The revised model template comprises at least one of a revised set of one or more process modules for obtaining the operational metric for each component and a revised set of one or more process modules for obtaining the operational metric for the service from the operational metric for each component. The process modules of the revised model template are dynamically deployed in connection with providing the service.

In one embodiment, making the one or more changes to the model template to form a revised model template comprising at least one of a revised set of one or more process modules for obtaining the operational metric for each component and a revised set of one or more process modules for obtaining the operational metric for the service from the operational metric for each component, includes inheriting component and process definitions from the model template that have not been redefined into the revised model template.

Figure 4B:
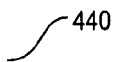
Figure 4B:
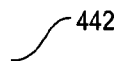
Figure 5B:
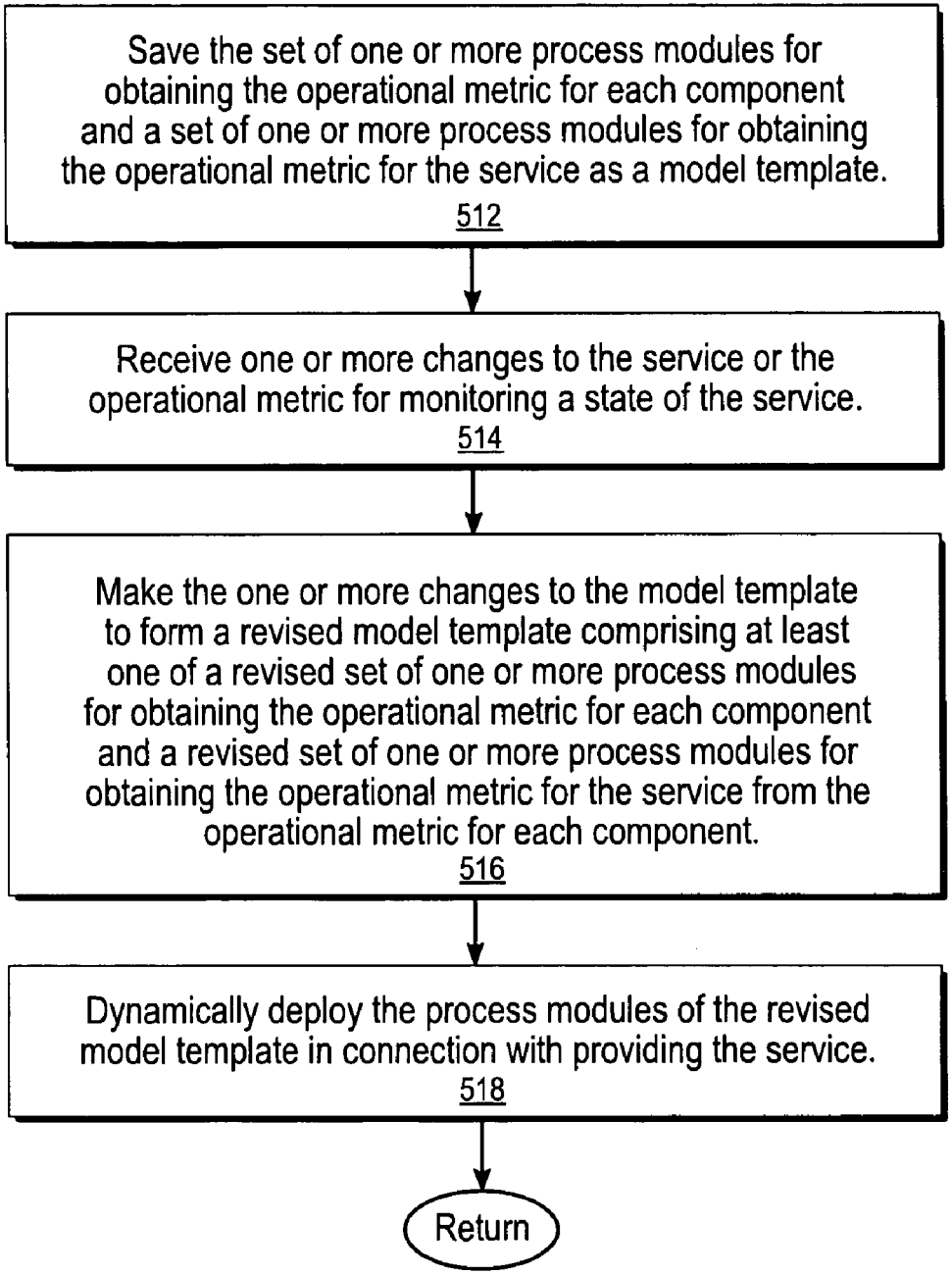

FIG. 5B is an operational flow diagram, which provides a high level overview of the use of inheritance to deploy derivative or related services from an existing service definition in one embodiment of the present invention. In block 512, the set of one or more process modules for obtaining the operational metric for each component and a set of one or more process modules for obtaining the operational metric for the service is saved as a model template. In block 514, one or more changes to the service or the operational metric for monitoring a state of the service is received. In block 516, the one or more changes to the model template are made to form a revised model template. The revised model template comprises at least one of a revised set of one or more process modules for obtaining the operational metric for each component and a revised set of one or more process modules for obtaining the operational metric for the service from the operational metric for each component. In block 518, the process modules of the revised model template are dynamically deployed. An example illustrating establishing a service based upon the existing operational metric definitions for the on-line bookstore service 300 will be described in further detail with reference to FIGS. 4A-4B below.

FIGS. 4A-4B are diagrams illustrating a description of an example network service in one embodiment of the present invention. As depicted by FIG. 4A, a service specification 440 for a service named "SIMPLEBOOKSTORE" includes a number of telemetry related definitions. (Service specification 440 also may include other definitions, however, these are not shown in FIG. 4A for clarity). An operational metric STATUS is defined as a key quality indicator (KQI). A plurality of components of service SIMPLEBOOKSTORE including "WebServer," "BusinessLogic," and "Database" are also defined by service specification 440. An aggregation function, "STATUS=WebServer+BusinessLogic+Database" is also provided in service specification 440. Based upon the service specification 440, a service, such as service 100 will be provisioned to include three components: a webserver, business logic and a database. Further, the service as provisioned will include telemetry monitors at each of these components. These component level telemetry monitors will provide information from specific acquisition mechanisms (not show by FIG. 4A) for each of the components, webserver, business logic and a database, which will be combined according to the aggregation function, "STATUS=WebServer+BusinessLogic+Database", to form an overall operational metric, STATUS for the SIMPLEBOOKSTORE service.

In one embodiment, inheritance enables eliminating the need to duplicate an entire service model definition when a revision that contains additional information or an acquisition mechanism that is changed. An inheritance mechanism may be used to override either a logical or a physical (acquisition) definition in the service model. As depicted by FIG. 4B, a service specification 442 for a service named "MYBOOKSTORE" is shown in addition to service specification 440 for the "SIMPLEBOOKSTORE" service. Service specification 442 includes a "<derived> SIMPLEBOOKSTORE" statement indicating that service 442 will inherit definitions of service specification 440 the "SIMPLEBOOKSTORE" service. One difference between the "MYBOOKSTORE" service and the definition of the "SIMPLEBOOKSTORE" service is that the operational metric STATUS which was defined as the key quality indicator for the "SIMPLEBOOKSTORE" service has been replaced by a new KQI definition named "THROUGPUT". In service specification 442, an aggregation function, "THROUGPUT=(WebServer+BusinessLogic)/Database" is provided. The definitions for components of service MYBOOKSTORE, including "WebServer," "BusinessLogic," and "Database" remain the same as the definitions of these components for the SIMPLEBOOKSTORE service specification 440. Accordingly, when the service MYBOOKSTORE is provisioned, this service will inherit such definitions of the service specification 440 for SIMPLEBOOKSTORE that have not been overridden in the service specification 442 for MYBOOKSTORE. In one embodiment, inheritance can enable definition of a "base" logical model, which later could be extended by various business services.

Hardware Overview

Figure 6:
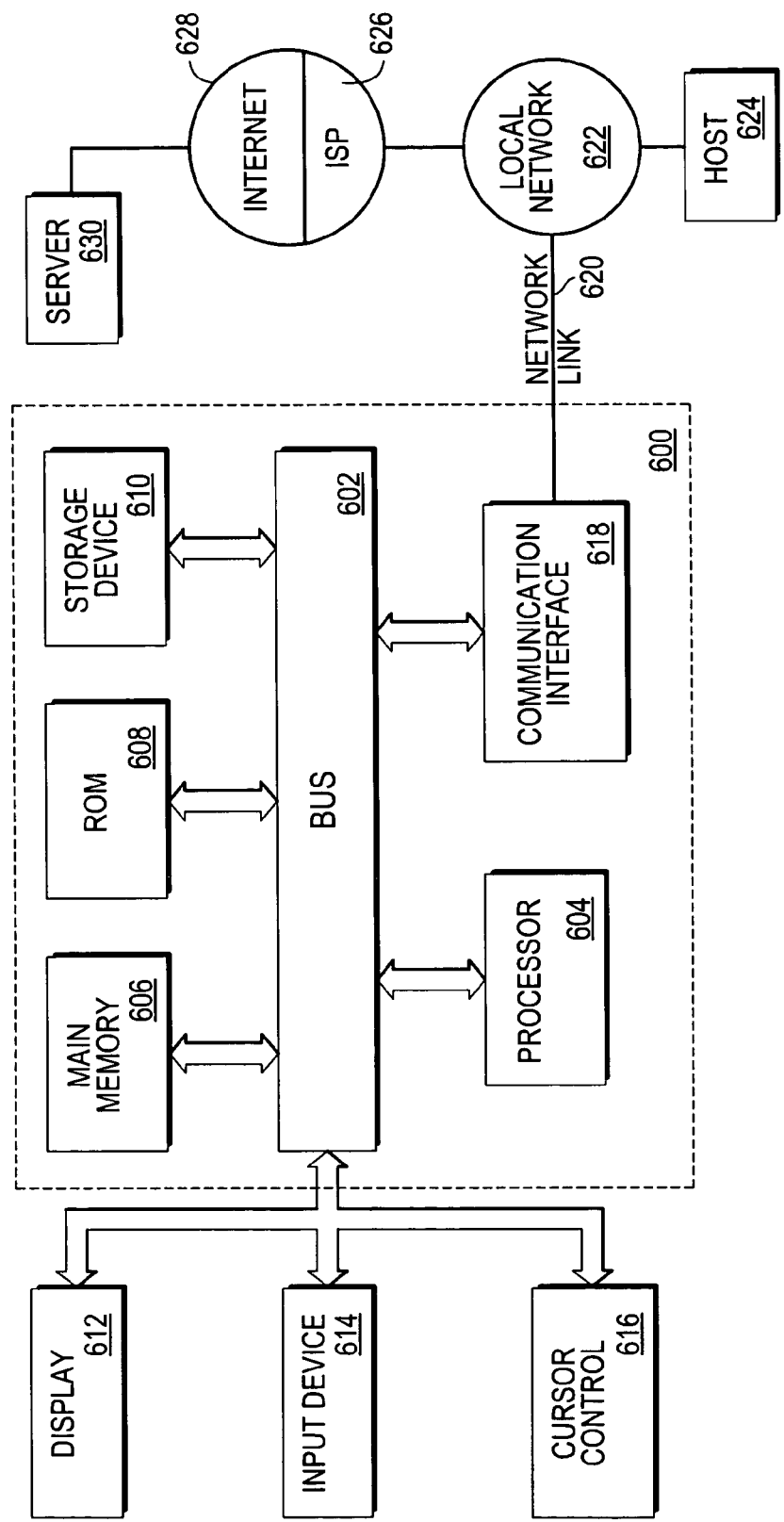
FIG. 6 is a hardware block diagram of an example computer system, which may be used to embody one or more components of an embodiment of the present invention.

FIG. 6 is a block diagram that illustrates a computer system 600 upon which an embodiment of the invention may be implemented. Computer system 600 includes a bus 602 for facilitating information exchange, and one or more processors 604 coupled with bus 602 for processing information. Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions by processor 604. Computer system 600 may further include a read only memory (ROM) 608 or other static storage device coupled to bus 602 for storing static information and instructions for processor 604. A storage device 610, such as a magnetic disk or optical disk, is provided and coupled to bus 602 for storing information and instructions. One or more of the components of the computer system 600 may be located remotely and accessed via a network.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

In computer system 600, bus 602 may be any mechanism and/or medium that enables information, signals, data, etc., to be exchanged between the various components. For example, bus 602 may be a set of conductors that carries electrical signals. Bus 602 may also be a wireless medium (e.g. air) that carries wireless signals between one or more of the components. Bus 602 may also be a medium (e.g. air) that enables signals to be capacitively exchanged between one or more of the components. Bus 602 may further be a network connection that connects one or more of the components. Overall, any mechanism and/or medium that enables information, signals, data, etc., to be exchanged between the various components may be used as bus 602.

Bus 602 may also be a combination of these mechanisms/media. For example, processor 604 may communicate with storage device 610 wirelessly. In such a case, the bus 602, from the standpoint of processor 604 and storage device 610, would be a wireless medium, such as air. Further, processor 604 may communicate with ROM 608 capacitively. In this instance, the bus 602 would be the medium (such as air) that enables this capacitive communication to take place. Further, processor 604 may communicate with main memory 606 via a network connection. In this case, the bus 602 would be the network connection. Further, processor 604 may communicate with display 612 via a set of conductors. In this instance, the bus 602 would be the set of conductors. Thus, depending upon how the various components communicate with each other, bus 602 may take on different forms. Bus 602, as shown in FIG. 6, functionally represents all of the mechanisms and/or media that enable information, signals, data, etc., to be exchanged between the various components.

The invention is related to the use of computer system 600 for implementing the techniques described herein. According to one embodiment of the invention, those techniques are performed by computer system 600 in response to processor 604 executing one or more sequences of one or more instructions contained in main memory 606. Such instructions may be read into main memory 606 from another machine-readable medium, such as storage device 610. Execution of the sequences of instructions contained in main memory 606 causes processor 604 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 600, various machine-readable media are involved, for example, in providing instructions to processor 604 for execution. Such a medium may take many tangible forms, including but not limited to, non-volatile media, volatile media, and transmission media. Non-volatile media includes, for example, optical or magnetic disks, such as storage device 610. Volatile media includes dynamic memory, such as main memory 606. Transmission media includes coaxial cables, copper wire and fiber optics, including the wires that comprise bus 602.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, or any other tangible medium from which a computer can read.

Various forms of machine-readable media may be involved in carrying one or more sequences of one or more instructions to processor 604 for execution. For example, the instructions may initially be carried on a magnetic disk of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are exemplary forms of carrier waves transporting the information.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution. In this manner, computer system 600 may obtain application code in the form of a carrier wave.

In the foregoing specification, it should be noted that although the invention has been described with reference to one embodiment, it should not be construed to be so limited. Various modifications may be made by those of ordinary skill in the art with the benefit of this disclosure without departing from the spirit of the invention. Thus, the invention should not be limited by the embodiments used to illustrate it but only by the scope of the issued claims. The specification and drawings are, accordingly, to be regarded as illustrative rather than limiting.

What is claimed is:

1. A non-transitory machine-readable storage medium carrying one or more sequences of instructions for creating a telemetry process for a deployed service, which instructions, when executed by one or more processors, cause the one or more processors to carry out the steps of:

receiving a service specification by a computing device configured to facilitate telemetric monitoring of the deployed service, wherein the deployed service comprises a plurality of applications that interact with one another, and wherein the service specification describes the plurality of applications;

receiving, by the computing device, a service operational metric for monitoring a state of the deployed service, wherein the service operational metric comprises an application operational metric for each of the plurality of applications;

determining, using the service specification and the service operational metric, a set of application process modules comprising a first application monitor configured to obtain a first application operational metric from a first application of the plurality of applications;

determining, using the service specification and the service operational metric, a set of service process modules comprising a first service monitor configured to obtain a first service operational metric using the first application operational metric;

dynamically deploying the set of application process modules and the set of service process modules by provisioning a device using the set of application process modules and the set of service process modules;

saving the set of application process modules and the set of service process modules as a model template;

receiving one or more changes to the deployed service or the service operational metric for monitoring a state of the service;

making the one or more changes to the model template to form a revised model template comprising at least one of a revised set of application process modules and a revised set of service process modules;

inheriting component and process definitions from the model template that have not been redefined into the revised model template; and dynamically deploying the revised model template in connection with providing the deployed service.

2. The non-transitory machine-readable storage medium of claim 1, wherein the service specification includes a set of elements and an element operational metric for each of the set of elements, wherein the elements interact with one another to provide each of the plurality of applications, and wherein the instructions for determining from the service specification and the service operational metric, the set of application process modules further comprise instructions for carrying out the steps of:

determining from the service specification and the service operational metric, a set of element process modules, wherein the set of element process modules is used to obtain the element operational metric for each element, and wherein the set of application process modules obtains the application operational metric from the element operational metric for each element of the set of elements.

3. The non-transitory machine-readable storage medium of claim 1, wherein the instructions for determining from the service specification and the service operational metric, a set of application process modules further comprise instructions for carrying out the steps of:

determining a process for computing a key quality indicator (KQI) for each application of the plurality of applications of the deployed service.

4. The non-transitory machine-readable medium of claim 3, wherein the one or more sequences of instructions for determining a process for computing a key quality indicator (KQI) for each application of the plurality of applications of the deployed service further comprise instructions for carrying out the steps of:

determining a dynamically configurable object class for the key quality indicator.

5. The non-transitory machine-readable storage medium of claim 1, wherein the one or more sequences of instructions for creating a telemetry process for a deployed service further comprise instructions for carrying out the steps of:

excluding any quantities not relevant to monitoring the state of the deployed service.

6. The non-transitory machine-readable storage medium of claim 1, wherein the one or more sequences of instructions for determining from the service specification and the operational metric for the deployed service, a set of application process modules and a set of service process modules further comprise instructions for carrying out the steps of:

determining, using the set of service process modules, which application operational metric is computed by the set of application process modules and exposed to the set of service process modules.

7. An apparatus, comprising:

a processor;

a memory, connected to the processor by a bus; and one or more stored sequences of instructions which, when executed by the processor, cause the processor to carry out the steps of:

receiving a service specification by a computing device configured to facilitate telemetric monitoring of a deployed service, wherein the deployed service comprises a plurality of applications that interact with one another, and wherein the service specification describes the plurality of applications;

receiving, by the computing device, a service operational metric for monitoring a state of the deployed service, wherein the service operational metric comprises an application operational metric for each of the plurality of applications;

determining, using the service specification and the service operational metric, a set of application process modules comprising a first application monitor configured to obtain a first application operational metric from a first application of the plurality of applications;

determining, using the service specification and the service operational metric, a set of service process modules comprising a first service monitor configured to obtain a first service operational metric using the first application operational metric;

dynamically deploying the set of application process modules and the set of service process modules by provisioning a device using the set of application process modules and the set of service process modules;

saving the set of application process modules and the set of service process modules as a model template;

receiving one or more changes to the deployed service or the service operational metric for monitoring a state of the service;

making the one or more changes to the model template to form a revised model template comprising at least one of a revised set of application process modules and a revised set of service process modules;

inheriting component and process definitions from the model template that have not been redefined into the revised model template; and dynamically deploying the revised model template in connection with providing the deployed service.

8. The apparatus of claim 7, wherein the service specification includes a set of elements and an element operational metric for each of the set of elements, wherein the elements interact with one another to provide each of the plurality of applications, and wherein determining from the service specification and the service operational metric, the set of application process modules further comprises:

determining from the service specification and the service operational metric, a set of element process modules, wherein the set of element process modules is used to obtain the element operational metric for each element, and wherein the set of application process modules obtains the application operational metric from the element operational metric for each element of the set of elements.

9. The apparatus of claim 7, wherein determining from the service specification and the service operational metric, a set of one or more application process modules further comprises:

determining a process for computing a key quality indicator (KQI) for each application of the plurality of applications of the deployed service.

10. The apparatus of claim 9, wherein determining a process for computing a key quality indicator (KQI) for each application of the plurality of applications of the deployed service further comprises:

determining a dynamically configurable object class for the key quality indicator.

11. The apparatus of claim 7, wherein the one or more stored sequences of instructions further comprise:

excluding any quantities not relevant to monitoring the state of the deployed service.

12. The apparatus of claim 7, wherein determining from the service specification and the operational metric for the deployed service, a set of application process modules and a set of service process modules further comprises:

determining, using the set of service process modules, which application operational metric is computed by the set of application process modules and exposed to the set of service process modules.

\* \* \* \* \*